United States Patent [19]
Alston

[11] Patent Number: 5,237,832
[45] Date of Patent: Aug. 24, 1993

[54] COMBINED MARINE REFRIGERATING AND AIR CONDITIONING SYSTEM USING THERMAL STORAGE

[76] Inventor: Gerald A. Alston, 4053 Harlan St. #113, Emeryville, Calif. 94608

[21] Appl. No.: 897,274

[22] Filed: Jun. 11, 1992

[51] Int. Cl.$^5$ ............................................. F25B 39/02
[52] U.S. Cl. ........................................ 62/200; 62/434; 62/439; 62/240; 165/134.1
[58] Field of Search .................. 62/175, 406, 430, 439, 62/513, 113, 199, 200, 434, 435, 240; 165/11.1, 134.1, 10 A, 95

[56] References Cited

U.S. PATENT DOCUMENTS

| | | | |
|---|---|---|---|
| 2,460,623 | 2/1949 | Zoppola | 62/434 |
| 2,497,903 | 2/1950 | Muffly | 62/157 |
| 2,576,663 | 11/1951 | Atchison | 62/199 |
| 2,859,945 | 11/1958 | Kleist | 62/439 X |
| 3,108,453 | 10/1963 | Tinkey | 62/200 |
| 3,545,228 | 12/1970 | Dinger et al. | 62/513 X |
| 4,483,151 | 11/1984 | Fujioka et al. | 62/200 X |
| 4,565,072 | 1/1986 | Fujiwara et al. | 62/196.2 |
| 4,637,220 | 1/1987 | Sakano | 62/200 |
| 4,637,222 | 1/1987 | Fujiwara et al. | 62/244 |
| 4,918,936 | 4/1990 | Sakamoto | 62/198 X |
| 4,928,493 | 5/1990 | Gilberston et al. | 165/10 X |
| 4,959,974 | 10/1990 | Kusakabe | 62/199 X |

Primary Examiner—Harry B. Tanner

[57] ABSTRACT

An energy efficient cooling system for marine applications which makes use of phase change and non-phase change thermal storage mediums to provide refrigerating and freezing temperatures in insulated ice box(es) for the storage of perishable foods while also providing air conditioning to human occupied cabin spaces. The invention is particularly well suited for ocean-going long distance pleasurecraft where energy is in short supply and only sporadically available. Suitable power supplies for the system include electro-chemical storage batteries, wind generators, photovoltaics, internal combustion generators and auxiliary engine powering DC alternators. The invention uses a single primary cooling circuit (8) comprised of a single refrigeration compressor (9), sea water cooled condenser (10), sea water pump (11), receiver (12) and filter/dryer (16). A refrigerant liquid phase subcooling heat exchanger (13) is utilized to prevent the formation of flash gas in the liquid lines which are frequently quite long in shipboard installations. Also incorporated is a suction accumulator (14) to increase compressor (9) reliability by preventing liquid slugging.

7 Claims, 6 Drawing Sheets

COMBINED MARINE REFRIGERATING AND AIR CONDITIONING SYSTEM USING THERMAL STORAGE

BACKGROUND

1. Field of Invention

The present invention relates to an energy efficient combined refrigerating and air conditioning system utilizing thermal storage. More particularly, the system is especially suited to marine use where small component size and maximum energy efficiency and reliability are desired and where a continuous energy source is often unavailable.

2. Description of the Prior Art

The use of independent refrigerating and air conditioning systems in shipboard applications is common and well established. Most new production vessels come equipped with built-in ice boxes into which a refrigeration evaporator may be installed. Similarly, air conditioners are often installed in a storage locker or engine room and vented through existing walls, bulkheads or cabinets into the cabin area. These refrigerating systems generally use different types of refrigerant gas and operate at different gas pressures than the air conditioning systems. The systems are typically required to operate both concurrently and independently. At sea, energy to power these systems is typically provided by batteries, photovoltaic panels, wind or diesel generators, or auxiliary engines. Energy is usually available only for a limited time and in limited quantity making energy efficiency of primary importance.

Because of these and other unique requirements of marine refrigerating and air conditioning systems it has not previously been practical to combine the systems in such a way as to make common use of major components such as compressors, condensers and cooling pumps. Combining such components would make it possible to reduce the initial cost of the systems and the associated cost of installing them. Also, by using fewer components, less space is taken by the cooling equipment and fewer spare replacement parts need to be carried on long voyages. Using fewer parts also improves the overall system reliability.

Prior art which successfully combines air conditioning and refrigeration is created primarily for use in automobiles where a large and constant supply of energy is provided via an internal combustion engine and variations in the installation requirements are few in number and insignificant. In such applications energy efficiency and installation versatility are second to such considerations as portability, low initial cost and the ability to operate at widely varying compressor speeds. Additionally, because of the short distance between the components, corrections for problems such as liquid line flash gas need not be made. Predictably, these inventions fail to perform satisfactorily when faced with the unique problems of shipboard application.

Means for using a single compressor to supply a plurality of evaporator coils is defined by Muffly, Fujiwara et al (U.S. Pat. No. 4,565,072), Sakano, Fujioka and Tinkey. All require that the compressor and associated equipment be large enough to cool all evaporators simultaneously since no means is provided for the utilization of thermal storage. Without such thermal storage it would be difficult or impossible to maintain stable temperatures during intermittent operation of individual evaporators. Consequently the large capacity which is required increases the size and cost of the system and greatly reduces energy efficiency when only one evaporator (refrigerator or air conditioner) is in use.

In a later patent (U.S. Pat. No. 4,637,222) Fujiwara et al shows a portable refrigerator with thermal storage for use in an air conditioned motor vehicle. This device uses forced air from a second evaporator to simultaneously cool the refrigerated box, it's contents and the thermal storage medium. While solving the thermal storage problem and making intermittent operation possible, such an approach emphasizes portability at the expense of energy efficiency which makes it unsatisfactory for shipboard use. Additionally, such a would suffer from icing of the evaporator if under continuous use as would be the case on a marine vessel.

Sakamoto provides two evaporators and thermal storage, however the device is intended only as an efficient refrigerator/freezer in which both evaporators cool the same space and operate at the same temperature. Altering the device for use as an air conditioner would render it ineffective as a refrigerator.

Tinkey accurately describes some of the problems encountered when trying to eliminate duplicate components in multi-evaporator, multi-temperature systems. However, the invention he describes is meant for simultaneous operation of the various evaporators and would require extensive and costly modification to existing refrigeration compressors.

OBJECTS AND ADVANTAGES

In view of the drawbacks of the prior art, it is an object of this invention to provide an reliable, energy efficient cooling system which, in a tropical environment, is capable of effectively maintaining a small, well insulated space at a lower temperature as is suitable for perishable food storage, and, a shipboard living space at a higher temperature as is comfortable for human occupation. Other object and advantages of the present invention are:

a. to provide a refrigerating and air conditioning system which is easy to install in the existing ice boxes and cabins of a wide variety of marine vessels.

b. to reduce system cost and size as well as the installation cost by using a single compressor, condenser, receiver and sea water pump to maintain numerous enclosed spaces at a wide range of preselected stable temperatures.

c. to minimize the total system energy consumption by reducing the maximum capacity of the individual components which make up the system through the use of thermal storage mediums.

d. to incorporate a liquid phase subcooling heat exchanger to prevent the formation of liquid line flash gas in installations where the liquid line is excessively long or is exposed to high temperatures.

e. to prevent liquid slugging of the compressor and thereby increase system reliability through the incorporation of a suction side accumulator.

The above and other objects, features and advantages of the present invention will be made more apparent by the following description with reference to the accompanying drawings.

REFERENCE NUMERALS IN DRAWINGS

8. Cooling circuit
9. Compressor
10. Condenser
11. Sea water pump
12. Receiver
13. Liquid-phase subcooling heat exchanger
14. Suction accumulator
15. Power supply
16. Filter/Dryer
18. Liquid refrigerant distributor
20. Sea water
22. Sea water shut off valve
24. Outer vessel hull
30. Refrigerator evaporator
31. Integral evaporator coil
32. Phase-change thermal storage solution
33. Sealed corrosion resistant container
34. Mounting flange
40. Air conditioning evaporator
41. Blower motor
42. Blower fan
43. Finned evaporator coil
44. Condensate drain
45. Support structure
50. Refrigerator expansion valve
51. Air conditioning expansion valve
60. Ice box
61. Ice box insulation
62. Removable top
70. Evaporator/heat exchanger
71. Finned heat transfer coil
72. Thermal storage solution reservoir
73. Filler cap
74. Insulation
75. Non-phased change thermal storage solution
76. Circulating pump
77. Air temperature thermostat
81. Sea water outlet
82. Sea water inlet
83. Refrigerant gas inlet
84. Refrigerant liquid outlet
85. Heat exchange tub bundle
86. Anaerobic corrosion protection device
87. Condenser housing
88. Hose bead
91. Existing wall
92. Louvered vent
93. Solenoid valve
94. Refrigerator thermostat
95. Air conditioning thermostat

DESCRIPTION OF THE INVENTION

A refrigerating and air conditioning system in accordance with the invention will be described below with references to FIGS. 1, 2, 3, 4, 5 and 6. The system as shown in FIG. I is comprised of a central cooling circuit 8 which is may be fitted into any available space aboard the vessel, a power supply 15 which is typically not dedicated solely to power this system, cooling water shut off valves 22 which provide safe access to seawater 20 through vessel hull 24 and refrigerator evaporator 30 and air conditioning evaporator 40. Within cooling circuit 8, Compressor 9, is typically of a reciprocating piston oil-sump type but may also be of rotary or swash-plate design, receives energy from an existing on-board power source 15 whose power is generated by mechanical, chemical or photovoltaic means. Refrigerator thermostat 94 and air conditioning thermostat 95 are fully adjustable within their required temperature ranges and are of the conventional gas charged absorption type.

Figure 2:
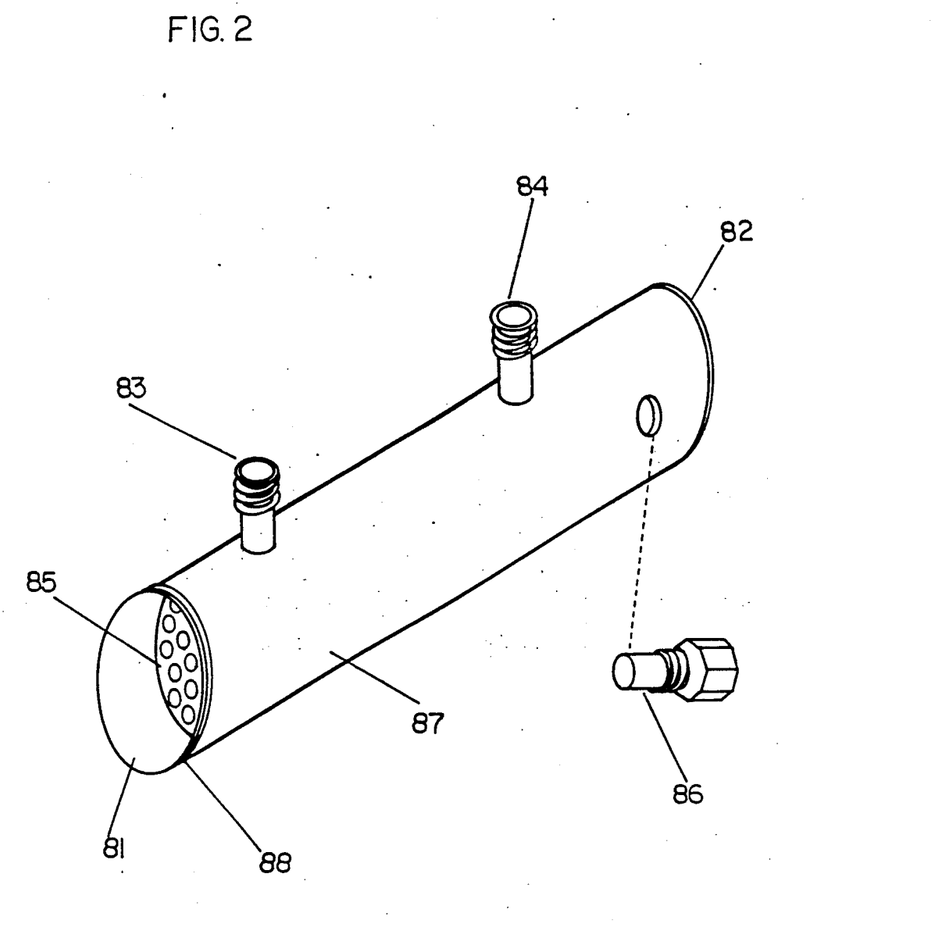
FIG. 2 - Is an isometric view of a sea water cooled condenser with corrosion protection device removed.

Condenser 10 shown in FIG. 2 is constructed of sea water corrosion resistant material such as 90/10 cupro-nickel or titanium and is comprised of a heat exchange tube 85 which is constructed of a like material to condenser 10 and is encased in condenser housing 87. Refrigerant gas inlet 83 and refrigerant liquid outlet 84 are designed to meet governing marine installation standards for pressurized gas tubing connections and allow easy, leak-proof installation of standard copper refrigeration tubing. Sea water inlet 82 and sea water outlet 81 are arranged so as to allow complete access to heat exchange tube bundle 85 for periodic inspection and cleaning. Hose bead 88 allows secure attachment of rubber hoses and is placed so as to meet governing marine installation standards for clamped rubber hose connections. Additional protection against electrolytic corrosion is provided by corrosion protection device 86 which is of the sacrificial type and constructed of a metal of lower nobility than that used in the construction of condenser 10. Condenser housing 87 is threaded to accommodate corrosion protection device 86 allowing easy periodic replacement and providing good electrical contact with condenser 10.

Figure 1:
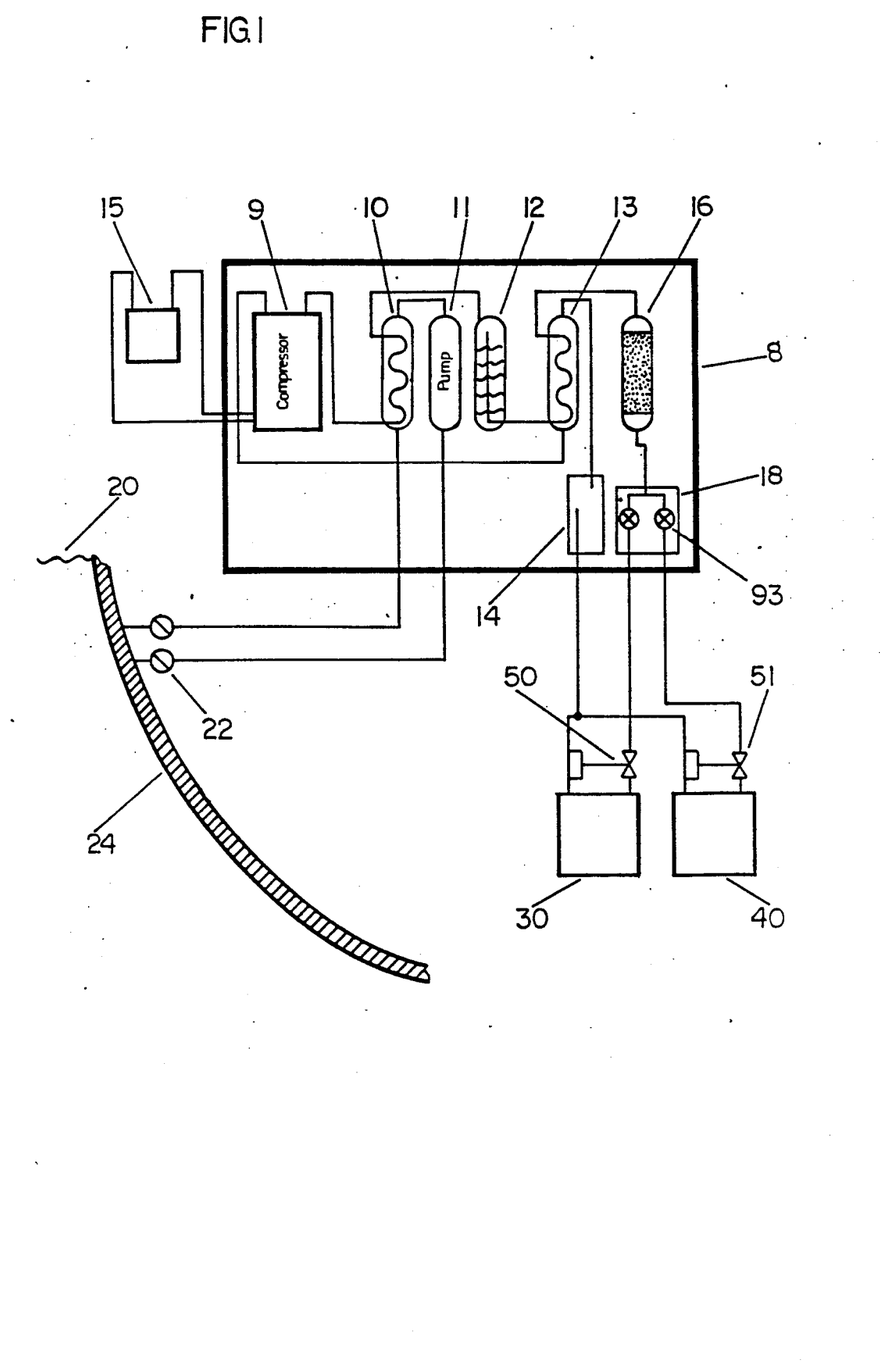
FIG. 1 - Is a block diagram showing an arrangement of a marine refrigerating and air conditioning system according to one embodiment of the present invention.

In FIG. 1, sea water pump 11 is constructed of sea water corrosion resistant material and receives energy from power supply 15. It is typically of the centrifugal type but may also be of flexible impeller or diaphragm design and is sized in accordance with ambient operating conditions so as to give a system high side refrigerant pressure which provides maximum system energy efficiency.

Receiver 12 is of standard design and is sized sufficiently large so as to accommodate the entire system refrigerant charge when it is in a liquified state. Liquid phase subcooling heat exchanger 13 may be separate from, or inclusive with, suction accumulator 14 and typically of the tube in tube type but may be of other non oil-trapping design. Sizing of liquid phase subcooling heat exchanger 13 is critical if adequate protection against the formation of flash gas in the system liquid line is to be achieved under all likely operating conditions. Since ideal sizing under average conditions will result in insufficient cooling in extreme circumstances, oversizing is preferable so long as oil trapping does not occur. Suction accumulator 14 should have sufficient capacity to accommodate the entire system refrigerant charge in a liquid state and should be able to perform it's intended function at a maximum 30 degree angle from it's standard mounting position to accommodate vessel heel. Selection of suction accumulator 14 is made by final testing of the complete system under a variety of operating conditions.

Filter/Dryer 16 is a standard design of the replaceable type which is compatible with the refrigerant used. Due to the excessively humid operating environment and the widely varying evaporator temperatures, the desiccant absorption capacity should be at least twice that recommended under normal operating conditions for an air conditioning system.

A liquid refrigerant distribution means 18 is comprised of single or multiple hermetically sealed, electromagnetically actuated solenoid valves 93 which may be of two-way or three-way design. Arrangement is such as to make it possible to allow liquid refrigerant to flow under pressure in a parallel fashion past a refrigerator expansion valve 50 of the thermostatic type to individual or multiple refrigerator evaporators 30 or past an air conditioner expansion valve 51 of the thermostatic or constant pressure type to individual or multiple air conditioning evaporators 40 but not to both simultaneously. Furthermore, arrangement is such as to always give activation priority to refrigerator expansion valve 50.

Figure 3:
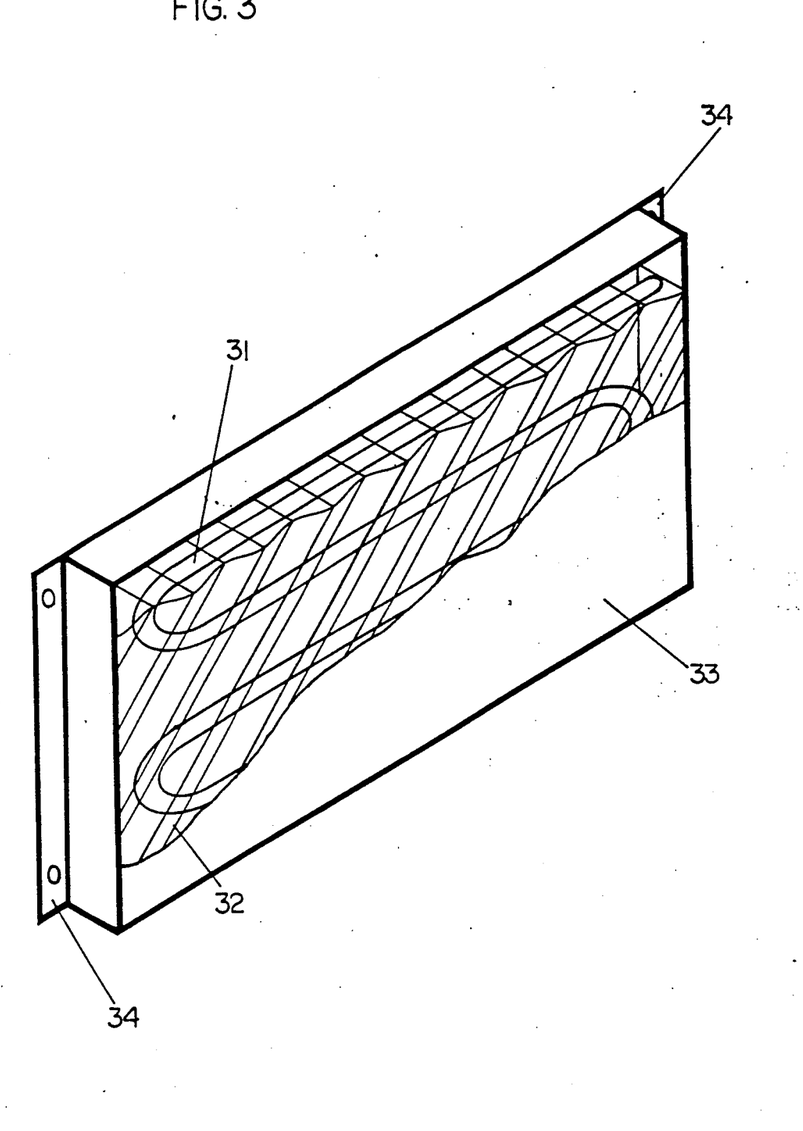
FIG. 3 - Is a cut-away isometric view of a refrigerator thermal storage tank with phase-change solution and integral evaporator coil.

A refrigerator evaporator 30 as shown in FIG. 3. is comprised of a sealed corrosion resistant container 33 with mounting flanges 34 which is typically constructed of type 316 stainless steel sheet metal, an internal evaporator coil 31 and a phasechange thermal storage solution 32. The length of the internal evaporator coil 31 should be sufficient to provide enough surface area to accommodate the full heat transfer capability of compressor 9. A phase change thermal storage material may be formulated of distilled water in combination with glycol, calcium chloride, sodium chloride or other similar substances in a manner such that the resulting mixture will absorb it's latent heat of fusion at a temperature ten degrees F below the ambient air temperature desired inside ice box 60.

Figure 4:
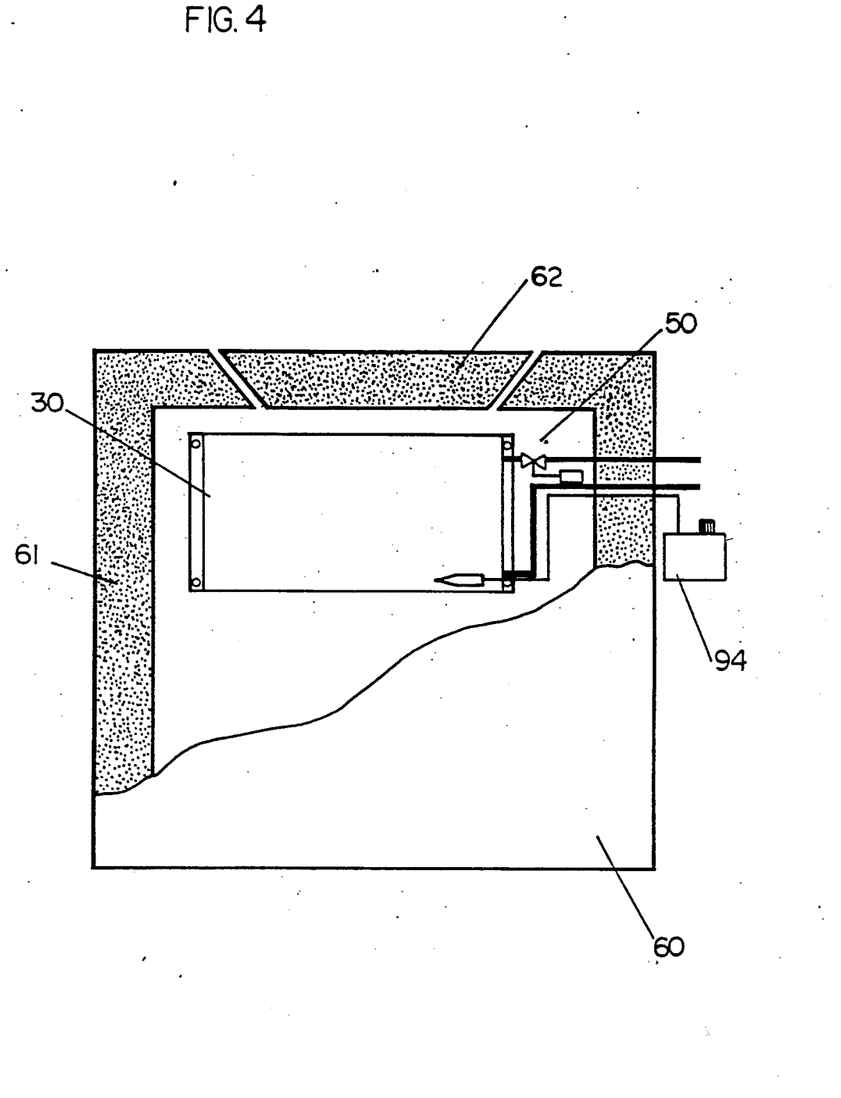
FIG. 4 - Is a cut away view of a refrigerator thermal storage tank installed in an insulated ice box of the type commonly found aboard marine vessels.

FIG. 4 shows refrigerator evaporator 30 as it is typically installed in an ice box 60 having insulation 61 and a removable lid 62. An ice box 60 of the this type commonly exists in a built-in manner on most marine craft but may be added if such is not present.

Figure 5:
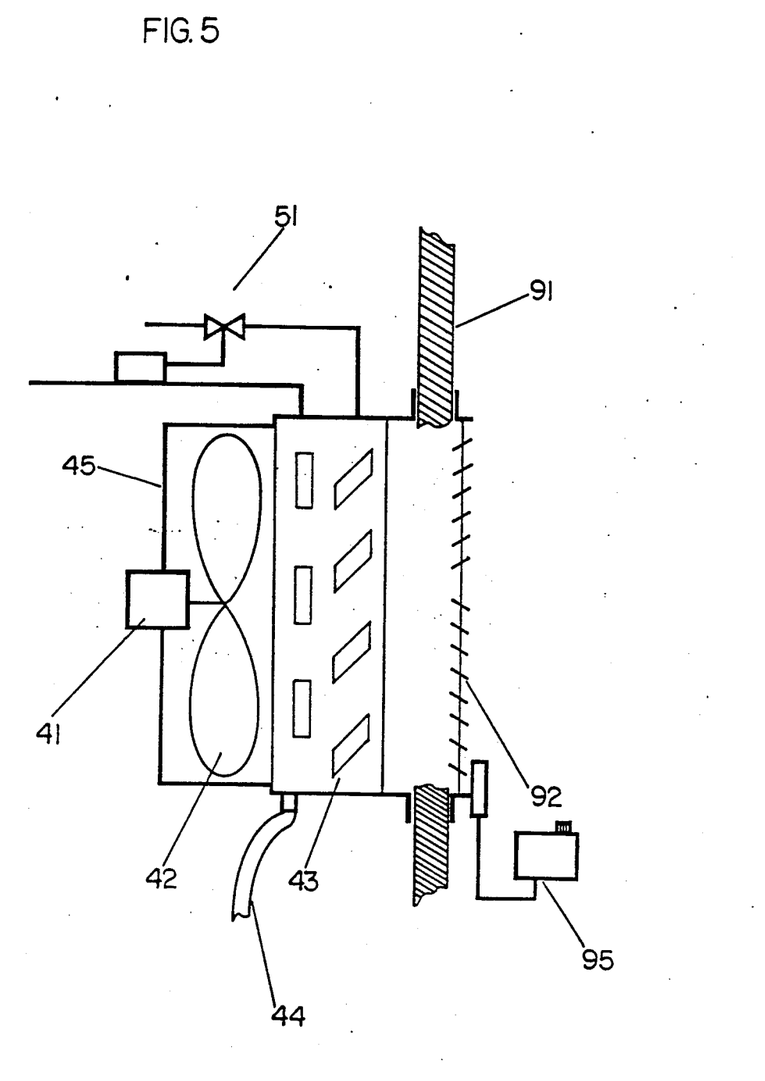
FIG. 5 - Is a side view of one embodiment of an air conditioning evaporator installed in an existing wall with a louvered vent covering the air discharge.

In one embodiment of the invention as shown in FIG. 5, an air conditioning evaporator 40 is mounted in an existing wall 91 and is comprised of a finned evaporator coil 43, a blower fan 42, a blower motor 42 which may be electrically powered by alternating or direct current, a condensate drain 44 and an outer support structure 45. Discharged cooled air is directed into the cabin area via a louvered vent 92.

Figure 6:
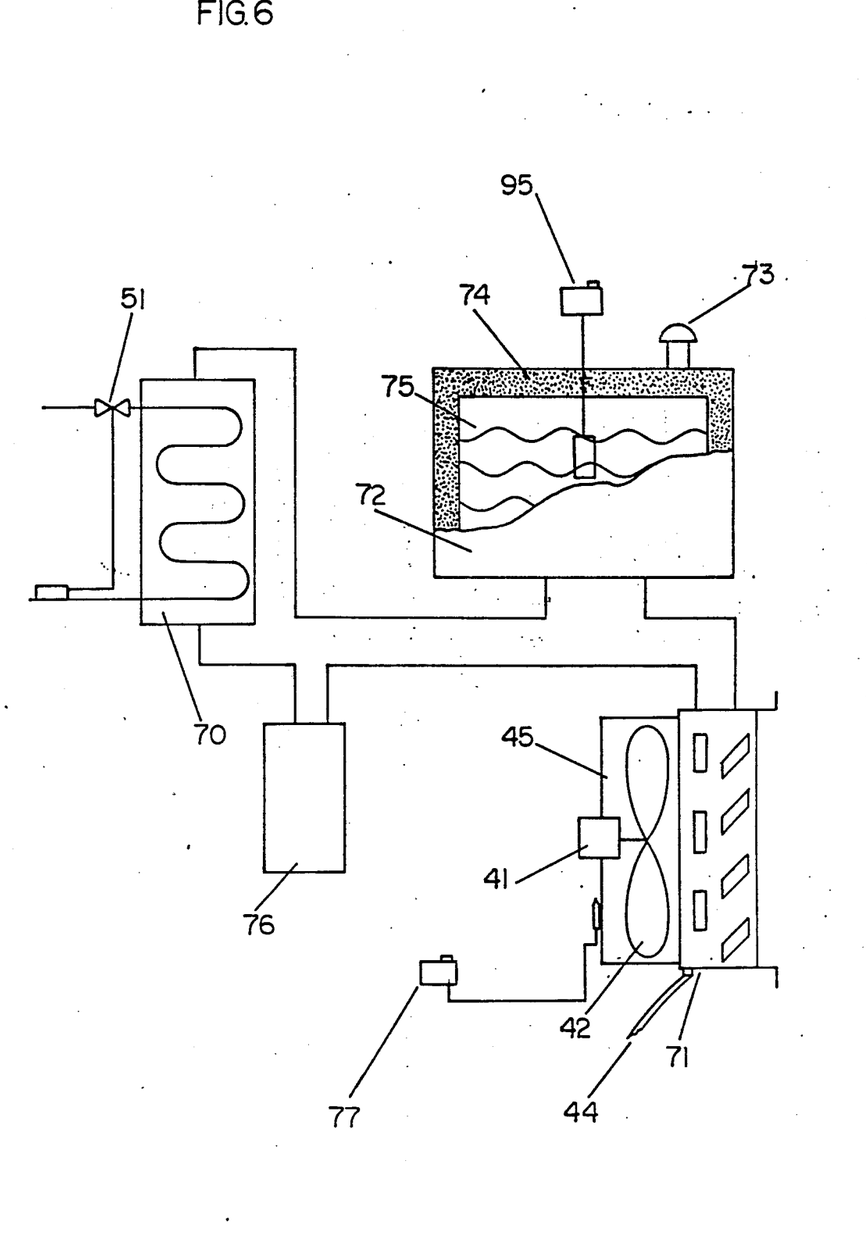
FIG. 6 - Is a block diagram of a second embodiment of an air conditioning evaporator which incorporates a remote evaporator and thermal storage and second heat exchanger.

In a second embodiment of the prescribed invention as shown in FIG. 6, an air conditioner evaporator 40 includes a provision for thermal storage. An evaporator/heat exchanger 70 may be mounted in series with an insulated 74 reservoir 72 (as shown) or may be integral to it. A circulating pump 76 operates with alternating or direct electrical current. A finned heat transfer coil 71, blower fan 42 and a blower motor 42 which may be electrically powered by alternating or direct current are mounted in a support structure 45 which includes a condensate drain 44. A non-phase change thermal storage solution 75 may be formulated with distilled water and glycol, alcohol or other anti-freezes in such a manner so as to remain liquid at temperatures encountered within the air conditioning circuit. Access to the inside of reservoir 72 is gained through a ventilated filler cap 73. Thermal storage solution thermostat 77 is fully adjustable within it's required temperature range and is of the conventional gas charged absorption type.

OPERATION OF INVENTION

Upon receiving and activation signal from either refrigerator thermostat 94 or air conditioning thermostat 95, compressor 9 is activated and begins drawing energy from power supply 15. Hot refrigerant gas is discharged from compressor 9 and flows via standard refrigeration tubing to condenser 10 through refrigerant gas inlet 83. Sea water 20 from outside vessel hull 24 is pulled past sea water shut off valve 22 by sea water pump 11 and enters heat exchange tube bundle 85 within condenser 10 through sea water inlet 82. Heat from the pressurized refrigerant gas is then absorbed by sea water 20 which causes the gas to cool and liquify. The warmed sea water 20 then exits condenser 10 by sea water outlet 81 and is discharged overboard.

Possible electrolytic corrosion of condenser 10 at this point is prevented by the materials used in it's construction and additionally by corrosion protection device 86 which is sacrificial in nature in a typical anode-cathode relationship.

The cooled and liquified refrigerant gas is stored in receiver 12 before flowing to liquid phase subcooling heat exchanger 13 where it is further cooled by releasing heat into the low pressure refrigerant vapor returning to the suction side of the compressor. The subcooled liquid refrigerant now enters filter/dryer 16 which removes any particulate matter or moisture which may be present.

Leaving filter/dryer 16, the subcooled refrigerant enters liquid refrigerant distributor 18 where it is routed to either refrigerator expansion valve 80 or air conditioning expansion valve 51 but not both simultaneously. If the compressor 9 activation signal was supplied by refrigerator thermostat 94 then refrigerator expansion valve 50 will be supplied whether or not an additional activation signal was also supplied by air conditioning thermostat 95. If compressor 9 activation signal was supplied by air conditioning thermostat 95 then liquid refrigerant will flow to air conditioning expansion valve 51 if, and only if, an additional compressor 9 activation signal is not also supplied by refrigerator thermostat 94. As such, cooling priority is always given to refrigerator evaporator 30.

If the compressor 9 activation signal was such as to supply liquid refrigerate to refrigerator expansion valve 50 then a solenoid 93 opens in such a manner as to allow the subcooled liquid refrigerant to be metered by refrigerator expansion valve 50 into refrigerator evaporator coil 31 in typical fashion at such a rate so as to produce efficient evaporation of the liquid refrigerant within evaporator coil 31. With evaporation, heat is drawn from phase change thermal storage solution 32 into the now gaseous refrigerant. The refrigerant gas then exits evaporator coil 31 and enters suction accumulator 14 which effectively removes any un-evaporated liquid refrigerant which may have remained in the gas. The gaseous refrigerant enters liquid phase subcooling heat exchanger 13 where it absorbs heat from the passing high pressure liquid refrigerant before returning to compressor 9.

The cooling cycle continues in this manner until sufficient heat has been removed from phase change thermal storage material 32 to cause it to freeze solid at which point the compressor 9 activation signal from refrigerator thermostat 94 ceases and the cycle stops. However, the latent heat of fusion of phase change thermal storage solution 32 will continue to remove heat from ice box 60 while compressor 9 is either de-activated entirely, or, removing heat from air conditioning evaporator 40.

Should the compressor 9 activation signal come from air conditioning thermostat 95 in the absence of a signal from refrigerator thermostat 94 then subcooled liquid refrigerant from liquid refrigerant distributor 18 will supply air conditioning expansion valve 51 and not refrigerator expansion valve 50.

In an embodiment of the invention in which air conditioning evaporator 40 is comprised in the manner shown in FIG. 5, evaporation of the liquid refrigerant takes place in finned evaporator coil 43. The control signal from air conditioner thermostat 95 causes simultaneous activation of blower motor 41 thereby spinning blower fan 4 thus causing air to flow past finned evaporator coil 43 where it gives up heat to the evaporating refrigerant. Thus cooled, it exits existing wall 91 via louvered vent 92 cooling the human occupied cabin. Condensate formed on finned evaporator 43 exits in a controlled manner through condensate drain 44 to the bilge of the vessel or a designated collection area. The cooling cycle will continue in this manner until the temperature of the air in the human occupied cabin has dropped sufficiently to cause air conditioning thermostat 95 to cease the compressor 9 activation signal. In this embodiment, air conditioning is possible only when no demand is made by refrigerator evaporator 30.

In an embodiment of the invention in which air conditioning evaporator 40 is comprised in the manner shown in FIG. 6 evaporation of the subcooled liquid refrigerant takes place in evaporator/heat exchanger 70. A control signal from air conditioner thermostat 95 causes simultaneous activation of circulating pump 76 but does not activate blower motor 41. This causes non-phase change thermal storage solution 75 to flow through evaporator/heat exchanger 70 where it gives up heat to the evaporating refrigerant thus lowering the temperature of non-phase change thermal storage solution 75.

Independently, an activation signal from air temperature thermostat 77 activates blower motor 41 which spins blower fan 42 causing air to flow past finned heat transfer coil 71. If circulating pump 76 is not currently activated, the control signal from air temperature thermostat 77 will also cause it to activate. Thus heat is absorbed from the air passing finned heat transfer coil 71 into the circulating non-phase change thermal storage solution 75. Condensate formed on finned evaporator 43 exits in a controlled manner through condensate drain 44 to the bilge of the vessel or a designated collection area.

In this embodiment, a control signal from air conditioner thermostat 95 removes heat from non-phase change thermal storage solution 75 but does not directly cool the air in the human occupied cabin. Rather, an independent control signal from air temperature thermostat 77 causes heat to be transferred from the air in the human occupied cabin into non-phase change thermal storage solution 75. Thus it is possible for compressor 9 to be either de-activated entirely or cooling refrigerator evaporator 30 while the stored cold in non-phase change thermal storage solution 75 provides air conditioning.

SUMMARY, RAMIFICATION, AND SCOPE OF THE INVENTION

Accordingly, the reader will see that the combined marine refrigerating and air conditioning system utilizing thermal storage described by the invention provides a significant improvement over the prior art. The invention offers greater energy efficiency and reliability while reducing space and initial system cost. It does not require major modification to current marine vessel design and makes extensive use of commonly available refrigerating and air conditioning components. It takes into account the numerous problems and requirements when such a system is used in marine applications. Additionally, it offers tremendous flexibility in accommodating the needs of the existing fleet of sea-going pleasurecraft as well as those which are yet to be built.

While my above description contains many details, these should not be construed as limitations on the scope of the invention, but rather preferred embodiments thereof. Many other variations are possible including the replacement of the standard gas charged thermostats with more sophisticated electronic control, the substitutions of phase change and non-phase change thermal storage mediums, the replacement of thermostatic and constant pressure expansion valves with electronically controlled versions, the addition of solar energy collection boosters, the addition of a liquid heating mechanism to the air conditioning system to provide heating as well as cooling through common vents, the inclusion of a phase change thermal storage medium in the insulate reservoir in such a manner as to separate it from the non-phase change thermal storage medium but allow heat transfer to occur, and the incorporation of a centralized forced air air conditioning heat exchanger which funnels the cooled air to various parts of the vessel via insulated or non-insulated ducts.

Accordingly, the scope of the invention should not be determined by the embodiments illustrated but by the appended claims and their legal equivalents.

I claim:

1. A refrigerating and air conditioning system for a marine vessel which comprises:
   a. a single compressor means to create a pressure differential in the refrigerant gas, and
   b. a water cooled condenser to cause the pressurized refrigerant gas to liquify, and
   c. a receiver to store liquidized refrigerant gas, and
   d. a heat transfer means to transfer heat from the liquified refrigerant at a higher pressure to the gaseous refrigerant at a lower pressure, and
   e. a means to remove moisture and particulate matter from the circulating refrigerant, and
   f. a liquid refrigerant distribution means to cause liquid refrigerant to flow in a controlled manner through any one of a plurality of circuits into expansion valves supplying a metered flow of refrigerant to refrigerating and air conditioning evaporator coils with such,
   g. refrigerating evaporator coils enclosed in a sealed container and surrounded by a liquid storing medium from which heat can be extracted causing the liquid to solidify and to which heat can be added causing the solidified medium to liquify with little rise in temperature and, such
   h. air conditioning evaporator coils positioned so that air pressurized by a blower shall flow over them enabling heat to be removed from the passing air into the evaporating refrigerant, and i. a means to remove liquid refrigerant from gaseous refrigerant flowing from the evaporators to the compressor.

2. The refrigerating and air conditioning system claimed in claim 1 whereby the condenser is protected from the corrosive effects of the cooling water by a replaceable corrosion protection device comprised of a sacrificial metal which is lower in nobility than that used to construct the condenser.

3. The refrigerating and air conditioning system claimed in claim 1 wherein said air conditioning evaporator is a second heat exchanger in a thermal storage system utilizing a liquid storage medium from which heat can be extracted and to which heat can be added is pumped with a circulating pump form an insulated reservoir into a first heat exchanger where the evaporating refrigerant removes heat from the liquid storage medium and, whereby the cooled liquid storage medium is further circulated from the insulated reservoir and the first heat exchanger to said second heat exchanger where it absorbs heat from the air before returning to the insulated reservoir.

4. An improved refrigeration/freezer and air conditioning system using one refrigerant gas compressor, receiver, filter/dryer and condenser wherein said improvement comprises:

a. a water cooled condenser of corrosion resistant material which is further protected from electrolytic corrosion by a sacrificial corrosion protection means, and b. a means by which heat is transferred from the liquified refrigerant gas on the high pressure side of the system to the gaseous refrigerant of the low pressure side of the system, and c. a means to hold in reserve liquid refrigerant passing through said low pressure side of said system until if can evaporate, and d. a liquid refrigerant distribution means which provides refrigerant either to a single or plurality of refrigerator/freezer evaporators or to a single or plurality of air conditioner evaporators at a time but not to both simultaneously, and e. a refrigerator/freezer evaporator coil encased in a sealed tank and immersed in a phase change thermal storage solution in a manner such that heat may transfer through said sealed tank into said phase change thermal storage solution where it is removed by said refrigerator/freezer evaporator coil, and f. an air conditioning evaporator connected in series with a circulating pump so as to remove heat from a liquid non-phase change thermal storage solution which is circulated by said circulating pump from an insulated reservoir to a finned heat exchanger across which air is forced by a fan in such a fashion that heat is transferred from said air into said liquid non-phase change thermal storage medium.

5. The refrigeration/freezer and air conditioning system claimed in claim 4 wherein the energy to power said system is a chemical storage battery.

6. The refrigeration/freezer and air conditioning system claimed in claim 4 wherein the energy to power said system is a diesel generator.

7. The refrigeration/freezer and air conditioning system claimed in claim 4 wherein the energy to power said system is an internal combustion engine.

* * * * *